(12) United States Patent
Mansikkaniemi (10) Patent No.: US 8,060,499 B2
(45) Date of Patent: Nov. 15, 2011

(54) SIMPLE DISCOVERY UI OF LOCATION AWARE INFORMATION

(75) Inventor: Tapio Mansikkaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 11/534,842

(22) Filed: Sep. 25, 2006

(65) Prior Publication Data

US 2008/0091689 A1 Apr. 17, 2008

(51) Int. Cl.
 *G06F 7/00* (2006.01)
 *G06F 17/30* (2006.01)
(52) U.S. Cl. .......... 707/724; 707/920
(58) Field of Classification Search ........... 707/899, 707/724, 918–920
 See application file for complete search history.

(56) References Cited

U.S. PATENT DOCUMENTS

| | | | | |
|---|---|---|---|---|
| 5,952,959 A * | 9/1999 | Norris | .............. | 342/357.34 |
| 6,360,167 B1 * | 3/2002 | Millington et al. | ........... | 701/211 |
| 6,542,814 B2 * | 4/2003 | Polidi et al. | ............. | 701/208 |
| 6,819,919 B1 * | 11/2004 | Tanaka | .............. | 455/414.1 |
| 6,845,321 B1 * | 1/2005 | Kerns | .............. | 701/209 |
| 7,082,365 B2 * | 7/2006 | Sheha et al. | ............. | 701/209 |
| 7,155,339 B2 * | 12/2006 | Tu | .............. | 701/209 |
| 7,236,799 B2 * | 6/2007 | Wilson et al. | ............. | 455/456.3 |
| 7,239,960 B2 * | 7/2007 | Yokota et al. | ............. | 701/202 |
| 7,272,489 B2 * | 9/2007 | Tu | .............. | 701/200 |
| 7,321,826 B2 * | 1/2008 | Sheha et al. | ............. | 701/209 |
| 7,330,112 B1 * | 2/2008 | Emigh et al. | ............. | 340/539.13 |
| 7,370,035 B2 * | 5/2008 | Gross et al. | ............. | 707/3 |
| 7,388,519 B1 * | 6/2008 | Kreft | .............. | 340/995.24 |
| 7,620,404 B2 * | 11/2009 | Chesnais et al. | ............. | 455/456.1 |
| 7,698,062 B1 * | 4/2010 | McMullen et al. | ............. | 701/211 |
| 7,720,844 B2 * | 5/2010 | Chu et al. | .............. | 707/724 |
| 7,761,350 B1 * | 7/2010 | Ridgeway | .............. | 705/30 |
| 2002/0065605 A1 | 5/2002 | Yokota | | |
| 2002/0183924 A1 * | 12/2002 | Yokota | .............. | 701/209 |
| 2003/0093419 A1 | 5/2003 | Bangalore et al. | | |
| 2003/0191578 A1 * | 10/2003 | Paulauskas et al. | ............. | 701/200 |
| 2003/0198346 A1 * | 10/2003 | Meifu et al. | ............. | 380/258 |
| 2003/0220835 A1 * | 11/2003 | Barnes, Jr. | ............. | 705/14 |
| 2004/0030493 A1 | 2/2004 | Pechatnikov et al. | | |
| 2004/0236504 A1 * | 11/2004 | Bickford et al. | .............. | 701/207 |
| 2004/0243307 A1 * | 12/2004 | Geelen | ............. | 701/213 |

(Continued)

FOREIGN PATENT DOCUMENTS

EP 1 258 707 A 11/2002

(Continued)

OTHER PUBLICATIONS

International Search Report, "Documents Considered to be Relevant", PCT/IB2007/002765, mailed Jun. 25, 2008.

*Primary Examiner* — James Trujillo
*Assistant Examiner* — Jeffrey A Burke
(74) *Attorney, Agent, or Firm* — Perman & Green, LLP (57) ABSTRACT

A system and method for rendering location dependent information on a communications terminal. A position of the communications terminal is retrieved and presented in a spatial orientation metaphor. A predetermined set of categories comprising objects with location dependent information are retrieved and criteria is determined for the objects to be retrieved. The determined objects associated with the set of categories are retrieved. Location dependent information associated with a first object of the determined objects is retrieved. The first object in the spatial orientation metaphor is presented.

26 Claims, 4 Drawing Sheets

U.S. PATENT DOCUMENTS

| | | |
|---|---|---|
| 2004/0254723 A1 | 12/2004 | Tu |
| 2004/0260464 A1 | 12/2004 | Wong |
| 2005/0136949 A1* | 6/2005 | Barnes, Jr. .................... 455/461 |
| 2005/0187707 A1* | 8/2005 | Yokota et al. ................. 701/209 |
| 2005/0202834 A1* | 9/2005 | Sudit .......................... 455/456.5 |
| 2005/0234637 A1 | 10/2005 | Obradovich et al. |
| 2005/0261822 A1 | 11/2005 | Wako |
| 2006/0074660 A1* | 4/2006 | Waters et al. ................. 704/251 |
| 2006/0200304 A1* | 9/2006 | Oh ............................... 701/200 |
| 2007/0050129 A1* | 3/2007 | Salmre ......................... 701/207 |
| 2007/0130153 A1* | 6/2007 | Nachman et al. ............... 707/10 |
| 2007/0281689 A1* | 12/2007 | Altman et al. ............. 455/435.1 |
| 2007/0282621 A1* | 12/2007 | Altman et al. .................... 705/1 |

FOREIGN PATENT DOCUMENTS

| | | |
|---|---|---|
| EP | 1 764 711 A | 3/2007 |
| JP | 09 236445 A | 9/1997 |
| JP | 2001 201353 A | 7/2001 |
| JP | 2005 083802 A | 3/2005 |
| WO | 2006032962 A | 3/2006 |

\* cited by examiner

SIMPLE DISCOVERY UI OF LOCATION AWARE INFORMATION

FIELD

The disclosed embodiments relate to a method for rendering location dependent information on a communication terminal. The embodiments further relate to a communication terminal, a computer program product, and a system for rendering location dependent information.

BACKGROUND ART

The disclosed embodiments are is generally within the field of personal navigation. One of the basic user scenarios in this field is the 'Find nearest' problem: What are the close by restaurants? What are the nearest gasoline stations or cinemas? Which people are around?

Also in the field of navigation is the closely related "Orient myself" problem: Where am I? How far am I from the nearest subway station? How long will it take me to get there?

The "Find nearest" and "Orient myself" problems primarily occur when a user enters unknown turf, during business or leisure traveling, when exploring parts of a city not visited frequently by the user, etc. As the working life as well as the private life are getting even more mobile and outgoing, the need for fast, easy-to-use and portable solutions to "Find nearest" and "Orient myself" problems are getting even more relevant.

Before the era of the Internet and mobile communication, the most common solutions to "Find nearest" and "Orient myself" problems were roadmaps, street signs, guide books such as Lonely Planet, and asking strangers for directions. These solutions were limited in the sense that the achieved information were often outdated or inadequate and it would often take the person quite some time to find what he or she was looking for. Furthermore, these solutions seriously lacked a coolness factor, as the user would have to stand around with a clumsy map and try to orient herself, which often lead to the user making a fast (and thus un-informed) choice to avoid too much public embarrassment.

With the advent of the Internet, content service providers such as Yahoo and Map24 started offering on-line applications allowing the user to key in his or her position along with a specification of what he or she was looking for. In more advanced versions, the application would then provide a list of the nearest options and potentially a route description of how to get there shown on a map. Such solutions suggested more options to the user and worked faster than the pre-Internet solutions mentioned above. However, as these web based solutions were not portable, the user would still be left with only a paper map when on the go.

Recently, personal orientation solutions such as those provided by Yahoo, Map24 and the like, have been embedded in mobile phone technology to overcome the lack of portability. One example of such a solution is the Wayfinder software based on the Nokia S60 platform. Here, the user can enter his or her position via textual input (e.g. street name, street number, city, country) and subsequently choose what to look for or specify a destination, and information about the destination and route suggestions are provided to the user.

The S60 technology does provide a portable solution to "Find nearest" and "Orient myself" problems, but there is room for improvement. With the current solution, the user has to provide several pieces of textual input before he finds what he is looking for. Also, the user will often have to iterate the input several times to seek out different options. Furthermore, it can be difficult for the user to see the information presented on the display, as the application originally was adapted for the significantly larger display connected to a personal computer. Thus, the current solution does not provide a fast, easy and cool solution to the "Find nearest" and "Orient myself" problems.

SUMMARY

It would be advantageous to wholly or partly overcome the above disadvantages and drawbacks of the prior art. More specifically in one aspect a method is provided for rendering location dependent information on a communications terminal, said method comprising retrieving a position of said communications terminal, presenting said position in said spatial orientation metaphor, retrieving a predetermined set of categories comprising objects with location dependent information, determining criteria for said objects to be retrieved, retrieving said determined objects associated with said set of categories, retrieving location dependent information associated with a first object of said determined objects, presenting said first object in said spatial orientation metaphor.

This method provides a fast and cool way of rendering location dependent information via a communications terminal. It can be adapted to a portable communications terminal such as a mobile phone, and will thus enable a user to get info on his position relative to an object such as a restaurant belonging to a category as for example Chinese restaurants, "chinese" then being the criteria for retrieval. By going through these steps and afterwards presenting a first object automatically on a spatial orientation metaphor, the user will get the desired location dependent information in a fast and cool way, a service which the current art does not provide.

Preferably, said method further comprises retrieving location dependent information associated with the remainder of said objects and presenting said remainder of said objects in said spatial orientation metaphor.

By also retrieving and presenting location dependent information about the remaining objects, it is possible to present a range of objects for the user to browse and choose between. For example, the retrieved and presented object could be all restaurants in a given proximity of the communications terminal and thus the user.

In a preferred embodiment, said method further comprising refining the number of said presented objects involving determining one or more preferred object from said objects by browsing the presented objects, exchanging information related to said one or more preferred objects with one or more external sources of information, and setting parameters for said spatial orientation metaphor. The advantage of refining the presented objects is that it enables the user to get to the desired piece of location dependent information faster.

Advantageously, the method's retrieving of said position involves retrieving said position from a GPS (Global Positioning System) network, retrieving said position by ground antenna network triangulation, retrieving said position from an input given by a user, or retrieving a remote position different from that of the position of said communications terminal.

The advantage of retrieving said position from a GPS network and by ground antenna triangulation is that a well-established and well-functioning technology is applied and that no user input is required. An advantage of retrieving said position from an input given by a user is that the dependence on an external network is eliminated and that it is possible to retrieve a position different from the actual position of the communications terminal.

Preferably, the spatial orientation metaphor of said method comprises a map over a proximity of said retrieved position. The advantage of a map is that it is a well-known and easy-to-use media for location dependent information for most users.

Advantageously, the predetermined set of categories of said method are any of a system-defined set of categories, a user-defined set of categories, a set of categories according to previous user input, a set of categories comprising most frequent visits in the past.

By using a system proposed set of categories, the amount of required user input is decreased, speeding up the rendering of location dependent information. A set of categories according to previous user input and a set of categories according to the most frequently visited brings along the advantage that the user's preferred categories are proposed automatically.

In a preferred embodiment, the method's criteria for determining objects to be retrieved are the objects belong to the same category, the objects are within a certain proximity of said retrieved position, the objects' popularity; or any combinations thereof. The advantages of these criteria are that they enable a fast and easy browsing of the retrieved objects.

In a preferred embodiment, the method's retrieval of objects associated with said set of categories involves determining association with metadata of said objects, searching through a content database stored in said communication terminal, and searching through an external content database. The advantage of searching through a content database stored in said communications terminal is that the information is always at hand regardless of the connection to an external network, whereas the advantage of searching through an external content database is that it decrease the need for local storage space on the communications terminal and allows easier update of the content.

Preferably, the method's presenting of the retrieved object in said spatial orientation metaphor is carried out by displaying an icon with appearance in accordance with metadata associated with said retrieved objects. The advantage of an icon is that is enables a small but easily recognized identifier suited for example the screen of a mobile phone.

Advantageously, the method presents the details of an object automatically in said spatial orientation metaphor after a predetermined idle time, by indicating selection of an object by pressing a key when a pointer is aligned with said object, by indicating selection by pressing a key associated with an object or any combinations thereof. By automatically presenting the details after an idle time, the details can be presented conveniently without further user input. The advantage of presenting the details by pressing a key, for example with a pointer is aligned with an object, is that the user has full control of what is presented when. Furthermore, by combining the idle time and the key pressing, the details can be presented with input, but speeded up by a user overruling the automatic presentation by pressing a key.

In a preferred embodiment, the method further comprises a step of determining a route to said retrieved objects. The advantage of this is that the user fast and efficiently can be presented with the desired location dependent information, for example the closest Chinese restaurant, as well as information on how to get there.

Preferably, the method presents a route to said retrieved objects. The advantage of this is that the user fast and efficiently is presented with the desired location dependent information, for example the closest Chinese restaurant, as well as information on how to get there.

Advantageously, the objects presented in said spatial orientation metaphor in the method can be browsed by physically interacting with a user interface presenting said spatial orientation metaphor. The advantage of this is that it enables a user to quickly look through the retrieved objects and potentially choose a favorite.

In a preferred embodiment, the method presents details of an object in said spatial orientation metaphor when a distance between said position and said object is within a predetermined value range. This makes it possible to focus the user's attention to nearby objects.

Preferably, the method's refining of retrieved objects is performed by receiving a textual user input, matching of a pattern in a search field with objects available for selection, or any combinations thereof.

Advantageously, the matching of the refining step involves receiving a first sequence of symbols from said search field, identifying a corresponding sequence of symbols in at least a first candidate item from a group of items, presenting a first candidate item comprising a corresponding sequence of symbols, and receiving a user input for selection of a candidate item. The advantage of this is that the user can easily control the refining by typically 2-5 keypad inputs, thus making for a fast and versatile refinement of the retrieved objects.

In a preferred embodiment, the method's presentation of objects matching text input is updated between each user input. The advantage of this is that it enables the user to quickly and efficiently refine to the point where a favorite object is apparent.

Preferably, the method's browsing of presented objects comprises toggling between objects, redrawing said spatial orientation metaphor in a case where a selected object is outside a display area, displaying object details upon a user input of pressing a key, displaying object details upon a user input of aligning a cursor with an object icon, displaying object details automatically if retrieved position and an object is within a predetermined distance, displaying object details automatically if only one object is present, displaying additional information of an object via an options menu or a soft key, or toggling between groups of objects according to predetermined range, time or number of objects. The advantage of the above mentioned is that they offer various ways of toggling between object details depending on the outcome of the refinement of the retrieved objects.

Advantageously, the method's step of exchanging information involves exchanging information with a recipient associated with a selected object, or exchanging information with web pages of destinations. The advantage of this is that it enables the user to retrieve more information than that immediately available. Also, it enables the user to contribute to the information associated with an object by for example submitting a review of the object to an external source of data, such as a webpage comprising restaurant reviews.

In a preferred embodiment, the method further comprises any of the following user configurable parameters: appearance of the presentation, behavior of the presentation, idle time before automatically retrieving or presenting detailed information, selection of categories, threshold range of distance between said position and a position of an object for automatic selection of said object, zoom level, or any combinations thereof. The advantage of these user configurable parameters are that they enable a user to adapt the method to most possible application areas.

Preferably, the method's retrieval of objects is carried out via any of the access technologies GPRS, Bluetooth, WLAN, SMS, MMS, e-mail, e2e messaging, client server protocols, or any combinations thereof. The advantage of any of these is that it adapts the method to existing system readily available and known to most users.

A further feature of the disclosed embodiments is to provide a communications terminal for rendering location dependent information, said terminal comprising a GPS for retrieving a position of said communications terminal, a processor for retrieving a predetermined set of categories comprising objects with location dependent information, determining criteria for said objects to be retrieved, retrieving said objects and location dependent information associated with these objects, and a user interface for presenting a spatial metaphor and one or more objects in said spatial metaphor. This communication terminal enables a satisfactory implementation of the method for rendering location dependent information of the present invention.

Preferably, the communications terminal comprises a mobile phone, a cellular phone, a smart terminal, a personal digital assistant (PDA) or any combination thereof.

A further feature of the disclosed embodiments is to provide a computer program product, such as a computer-readable medium having computer-executable components, for rendering location dependent information, said computer program product being adapted to retrieve a position of said communications terminal, present said position in a spatial orientation metaphor, retrieve a predetermined set of categories comprising objects with location dependent information, determine criteria for said objects to be retrieved, retrieve said determined objects associated with said set of categories, retrieve location dependent information associated with a first object of said determined objects, present said first object in said spatial orientation metaphor.

Preferably, the computer program product is further adapted to retrieve location dependent information associated with the remainder of said objects, and present said remainder of said objects in said spatial orientation metaphor.

Advantageously, the computer program product's refining of the number of said presented objects involves determining one or more preferred objects from said objects by browsing the presented objects, exchanging information related to said one or more preferred objects with one or more external sources of information, setting parameters for said spatial orientation metaphor.

A further feature of the disclosed embodiments is to provide a system comprising a server, a communication network, and a communications terminal, wherein said server and said communications terminal are communicating via said communications network, and wherein said server is adapted to provide said communications terminal with a predetermined set of categories comprising objects with location dependent information, determining criteria for said objects to be retrieved, retrieving said determined objects associated with said set of categories, and retrieving location dependent information associated with a first object of said determined objects.

Preferably, the system's server provides an application for rendering location dependent information which is executed on said communications terminal.

Advantageously, the system's application is browser based.

BRIEF DESCRIPTION OF THE DRAWINGS

The invention and its many advantages will be described in more detail below with reference to the accompanying schematic drawings, which for the purpose of illustration show some non-limiting embodiments and in which.

DESCRIPTION OF PREFERRED EMBODIMENTS

Figure 1:
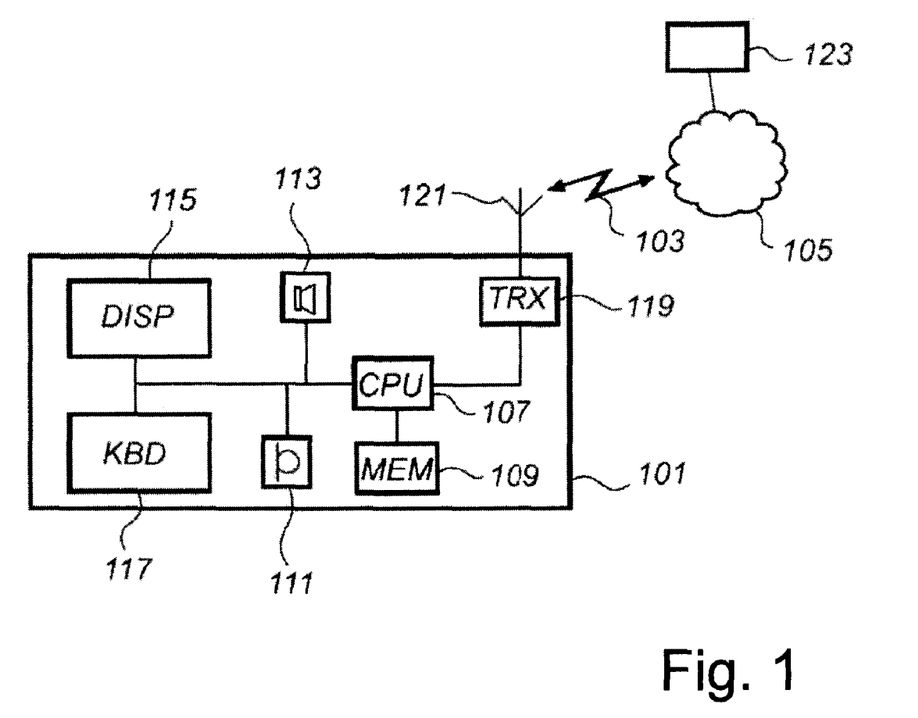
FIG. 1 shows a communications terminal network.

FIG. 1 illustrates schematically a communication terminal 101 in which the present invention is implemented. The terminal 101 is capable of communication via an air interface 103 with a radio communication network 105 such as the well known systems CDMA2000, D-AMPS, GSM, UMTS, EDGE, etc. The terminal comprises a processor 107, memory 109 as well as input/output units in the form of a microphone 111, a speaker 113, a display 115 and a keyboard 117. Radio communication is realized by radio circuitry 119 and an antenna 121. Connected to the radio communication network 105 is a controller 123. The details regarding how these units communicate are known to the person skilled in the art and is therefore not discussed further. The terminal 101 is further capable of communication via the air interface 103 with a global positioning system (GPS) 130 for determining its current position.

Figure 2:
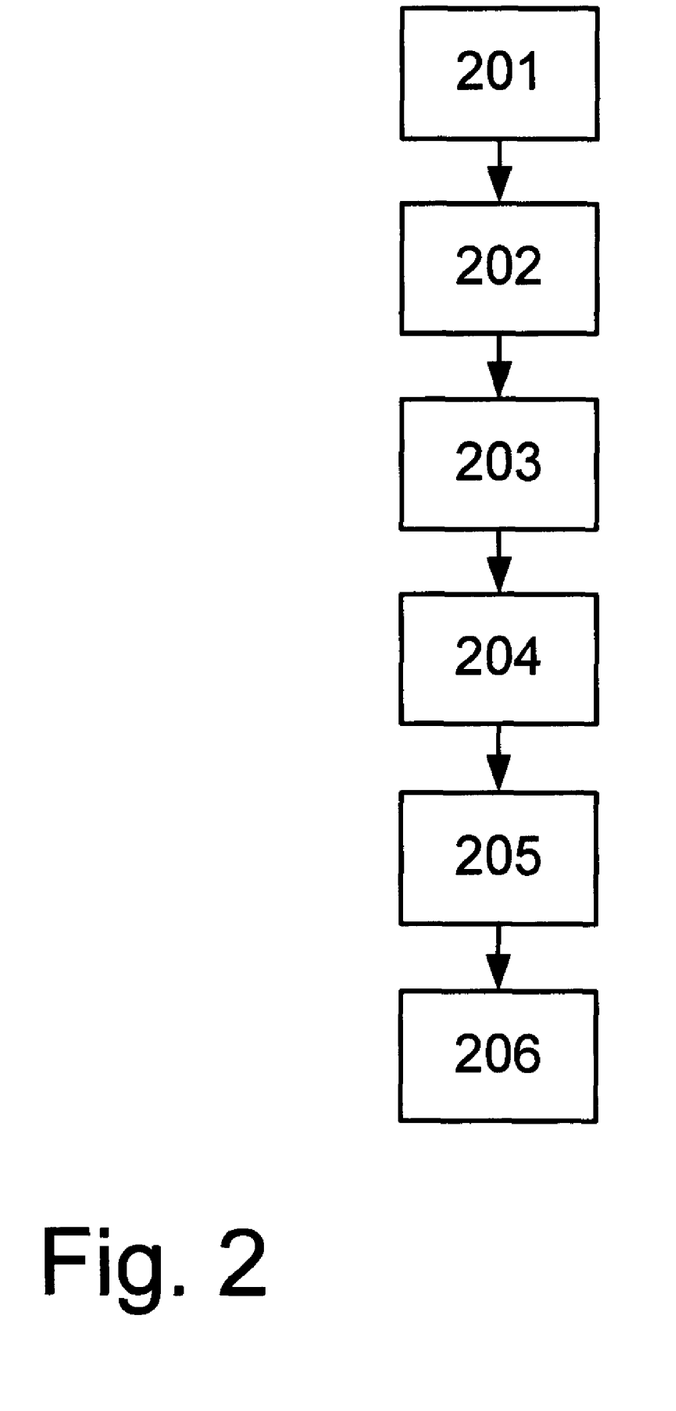
FIG. 2 shows a flowchart of a method for rendering location dependent information.

FIG. 2 shows a flowchart for a method for rendering location dependent information on a mobile communications terminal. In a first step 201 of the depicted method, the current position of the mobile communications terminal is determined. The determination of the current position can be done by connecting to a satellite network such as the GPS, but it can also be done by triangulation from a mobile phone network such as a GSM network (step 6) or by any other means for position determination. In a second step 202 of the method, the determined position is presented to the user in a spatial orientation metaphor. This spatial orientation metaphor can for example be a map or an air photo. In a third step 203 of the method, a set of categories is retrieved, the categories being for instance restaurants, cinemas, cultural attractions, community services, grocery stores, hotels, other communication terminals or the like. With a category comprising other people's communication terminals a user can be enabled to determine the position of people he knows. The set of categories can have a default setting, but can also be predetermined by the user. The categories can also be adapted to historic choices of the user. Once the set of categories have been retrieved and one or more categories of choice have been specified, objects are retrieved in a fourth step 204 from the category in accordance with the position determined in the first step 201. The objects can be retrieved from a local storage such as an MMC-card but it can also be retrieved from a remote server. The information retrieved comprising information of the objects can also comprise details of the distance from the determined position to the various objects. The information on the various object may in addition be updated continuously in accordance with changes in the position of the mobile communications terminal. In a fifth step 205, the information retrieved on the various objects from the selected category can be presented on a two-dimensional (2D) or a three-dimensional (3D) map on the screen of the communications terminal, but it can also be presented on an air photo in 2D or 3D, also on the screen. The number of objects displayed should depend on the determined zoom level of the spatial orientation metaphor, so that a low zoom level will allow a large number of objects to be displayed and a high zoom level will display less objects.

After the presentation of the retrieved location dependent information, the user has the option to refine presented information in a sixth step 206. This can be to refine a search for restaurants to only include Chinese restaurants or to only include restaurants starting with the letter "C" or the like. Furthermore, the user can browse the retrieved objects by retrieving further details about the various objects. These details can originate from an external database, from a homepage on the world wide web associated with the object in question or any other external source of further details. Also, the external source can be route planners, yellow pages or the like.

Figure 3:
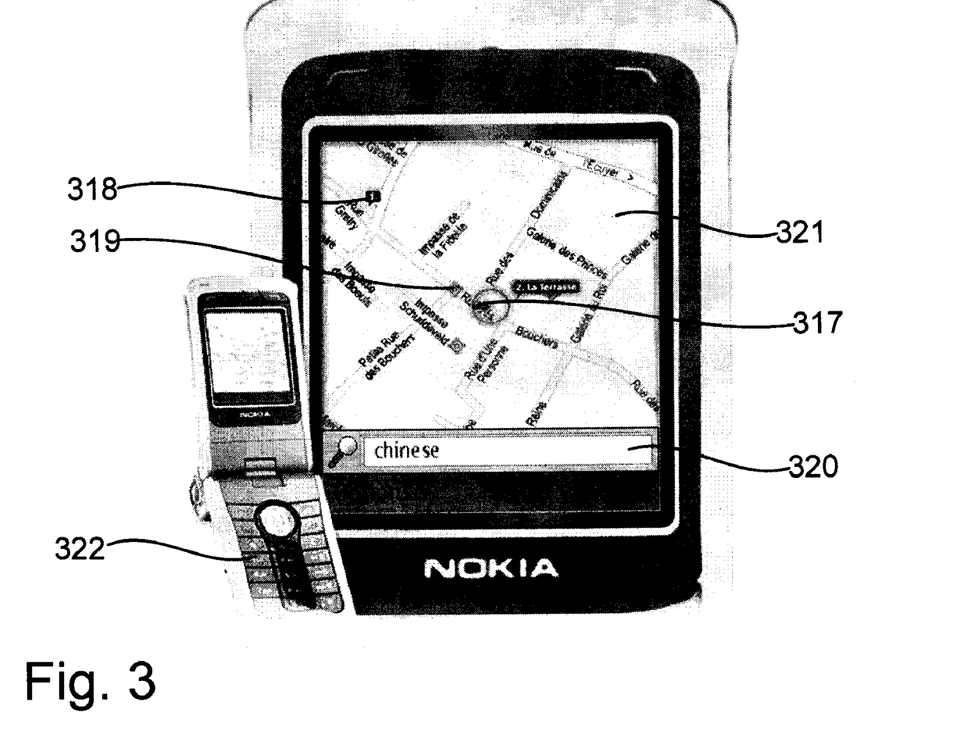
FIG. 3 shows an example of refining location dependent information.

In FIG. 3 is shown an example of refining the location dependent information by means of search box 320 for user input present on top of a presented 2D map 321 with the retrieved information such as the position of the terminal 317, the nearest object 319, and a selected object 318. The user input can be in pattern comprising letters, numbers or words. In the example in FIG. 3, the user has via a keypad 322 entered the word "chinese", whereby the information presented on the 2D map 321 is refined to only include Chinese restaurants 318. The refining by textual input can be adapted to refine further and further as more and text is entered, so for example the textual input "chi" would refine a restaurant search to only include Chinese restaurants, Chili restaurants or restaurants with a name containing the text string "chi", whereas expanding the input to "Chinese" would refine the search to only include Chinese restaurants. Once the location dependent information has been refined to a desired level, the user can in an additional step browse through the results by means of a user input interface (e.g. a joystick or a keypad) of the communications terminal to find a preferred object. The browsing can include toggling between pop-up windows containing further details about the refined objects, but it can also be browsing according to historic popularity or another favorisation criteria.

Figure 4A:
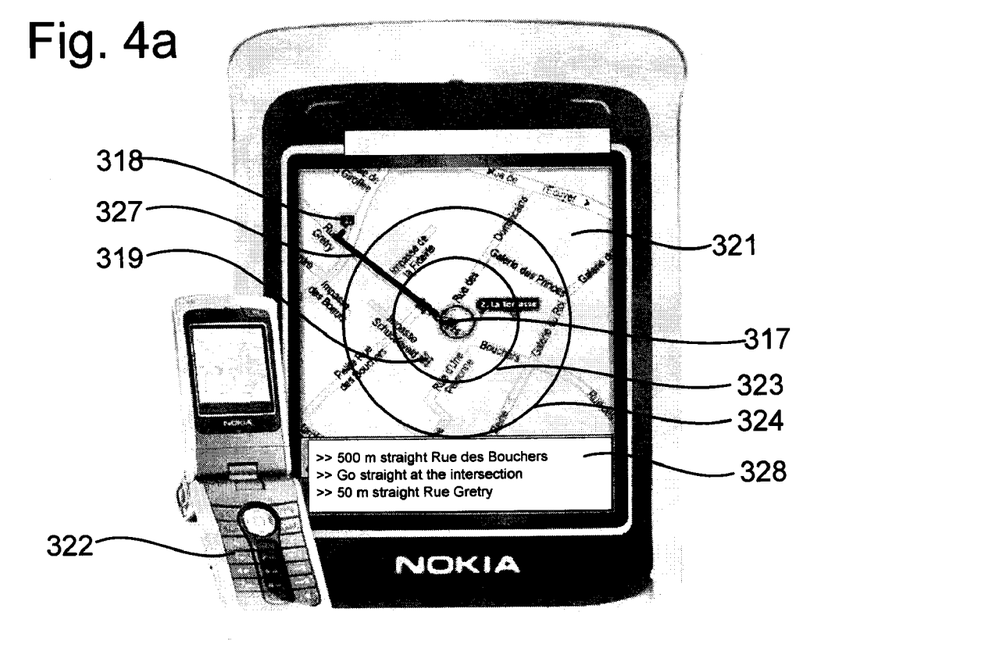
FIG. 4 shows examples of how to present location dependent information.
Figure 4B:
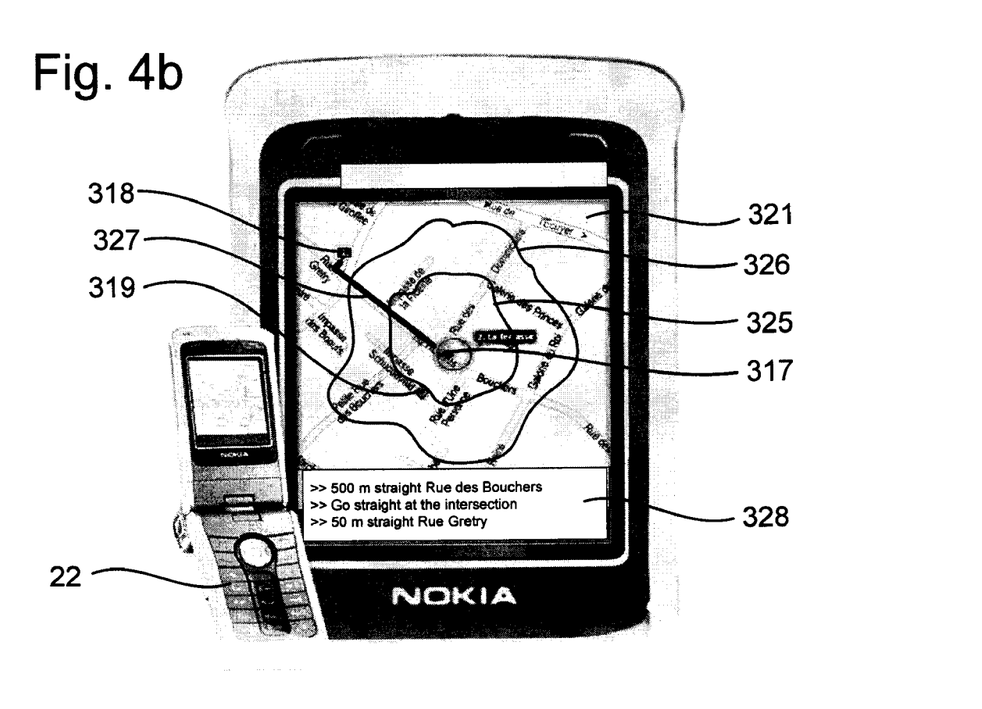

Upon selection of one of the objects, a route from the current position of the communications terminal to the selected object can be presented on the screen of the communication terminal. As illustrated in FIG. 4, this can be in the form of a line 327 to follow on a 2d map 321, it can be a list of directions 328 to which streets to follows or a combination thereof. It can also be audio instructions given to the user about when to turn left or right etc. Furthermore, the map can contain concentric circles (323 and 324) illustrating different distances such as 500 meters or 1000 meters from the position 317 to the objects (318 and 319 and the like). Such circles can enable the user to quickly know how far it is from his current position to the object presented on the map. Instead of concentric circles showing the absolute distance, different walking distances can be illustrated on the map 321 as circle-like lines (325 and 326) as shown in FIG. 4b. This functionality is especially interesting in a case where a user has pre-selected historic or cultural locations of interest and, for instance during a tour of a city detailed information of sights is automatically presented when passing by sufficiently close to the sights of interest. The user may also select a specific category, or specific items from one or more categories and then be presented a route connecting these items such as to create an individual tour. Conveniently, the user can follow the path on the map presented by the terminal, and as the user is approaching a point of interest, such as a church, a fountain, plaza, or the like, detailed information automatically comes up on the screen. In case the user is particularly interested in the object, further sources of information may be provided such as Internet links, books or souvenirs related to the sight.

The detailed information may be a description of the sight, opening hours, contact information, etc. A sight can be a historic building, shop, public restroom, etc. interactive guide.

The invention claimed is:

1. A method comprising:
    using a processor of a communications terminal to retrieve a position of the communications terminal;
    presenting said position in a spatial orientation metaphor on a display of the communications terminal;
    using the processor to retrieve a predetermined set of categories comprising objects with location dependent information;
    using the processor to determine criteria for said objects to be retrieved;
    using the processor to retrieve said determined objects associated with said set of categories;
    using the processor to retrieve location dependent information associated with a first object of said determined objects;
    presenting said first object in said spatial orientation metaphor on the display of the communications terminal; and
    presenting details of the first object in the spatial orientation metaphor when the processor determines that a distance between said position and said first object is within a predetermined value range, wherein said details include descriptive and contact information;
    upon selection of the first object, automatically presenting route information from the position of the communications terminal to the first object;
    retrieving location dependent information associated with a remainder of said objects;
    presenting said remainder of said objects in said spatial orientation metaphor;
    refining a number of presented objects where the refining includes entering at least a string of alphanumeric characters and only presenting objects corresponding to the entered string of alphanumeric characters, where a refined list of objects corresponding to the entered string of alphanumeric characters changes as additional characters are added to the string of alphanumeric characters; and
    overlaying indicators on the spatial orientation metaphor where each indicator originates from and surrounds the position, where the indicators are distinct from the predetermined value range and are arranged to provide distance information at predetermined spaced apart intervals radiating from the position, where the predetermined intervals provide an estimation of a distance between the position and the determined objects.

2. The method according to claim 1 where refining the number of said presented objects further involves:
    determining one or more preferred objects from said objects by browsing the presented objects;
    exchanging information related to said one or more preferred objects with one or more external sources of information; or
    setting parameters for said spatial orientation metaphor.

3. The method according claim 1, wherein said step of retrieving said position involves any of the following:
    retrieving said position from a GPS network;
    retrieving said position by ground antenna network triangulation;
    retrieving said position from an input given by a user; or
    retrieving a remote position different from that of the position of said communications terminal.

4. The method according to claim 1, wherein said spatial orientation metaphor comprises a map over a proximity of said retrieved position.

5. The method according to claim 1, wherein said predetermined set of categories are any of the following:
   a system-defined set of categories;
   a user-defined set of categories;
   a set of categories according to previous user input;
   a set of categories comprising most frequent visits in the past.

6. The method according to claim 1, wherein the criteria for determining objects to be retrieved are any of the following:
   the objects belong to the same category;
   the objects are within a certain proximity of said retrieved position;
   the objects' popularity; or
   any combinations thereof.

7. The method according to claim 1, wherein said retrieval of objects associated with said set of categories involves any of the following:
   determining association with metadata of said objects;
   searching through a content database stored in said communication terminal;
   searching through an external content database.

8. The method according to claim 1, wherein presenting the retrieved object in said spatial orientation metaphor is carried out by displaying an icon with appearance in accordance with metadata associated with said retrieved object.

9. The method according to claim 1, wherein details of an object are presented:
   automatically in said spatial orientation metaphor after a predetermined idle time;
   by indicating selection of an object by pressing a key when a pointer is aligned with said object; or
   by indicating selection by pressing a key associated with an object; or
   any combinations thereof.

10. The method according to claim 1, further comprising determining a route from the first object to and between each of said retrieved objects.

11. The method according to claim 1, wherein a route to the retrieved object is presented in said spatial orientation metaphor.

12. The method according to claim 1, wherein the objects presented in said spatial orientation metaphor can be browsed by physically interacting with a user interface presenting said spatial orientation metaphor.

13. The method according to claim 2, wherein said refining of retrieved objects is performed by any of the following:
   receiving a textual user input;
   matching of a pattern in a search field with objects available for selection; or
   any combinations thereof.

14. The method according to claim 13, wherein said matching involves any of the following:
   receiving a first sequence of symbols from said search field;
   identifying a corresponding sequence of symbols in at least a first candidate item from a group of items;
   presenting a first candidate item comprising a corresponding sequence of symbols; and
   receiving a user input for selection of a candidate item.

15. The method according to claim 13, wherein said presentation of objects matching text input is updated between each user input.

16. The method according to claim 1, wherein said browsing of presented objects comprises any of the following:
   toggling between objects;
   redrawing said spatial orientation metaphor in a case where a selected object is outside a display area;
   displaying object details upon a user input of pressing a key;
   displaying object details upon a user input of aligning a cursor with an object icon;
   displaying object details automatically if retrieved position and an object is within a predetermined distance;
   displaying object details automatically if only one object is present;
   displaying additional information of an object via an options menu or a soft key; or
   toggling between groups of objects according to predetermined range, time or number of objects.

17. The method according to claim 2, wherein said exchanging information involves any of the following:
   exchanging information with a recipient associated with a selected object; or
   exchanging information with web pages of destinations.

18. The method according to claim 1, further comprising any of the following user configurable parameters:
   appearance of the presentation;
   behavior of the presentation;
   idle time before automatically retrieving or presenting detailed information;
   selection of categories;
   threshold range of distance between said position and a position of an object for automatic selection of said object;
   zoom level;
   or any combinations thereof.

19. The method according to claim 1, wherein the retrieval of objects is carried out via any of the access technologies GPRS, Bluetooth, WLAN, SMS, MMS, e2e messaging, client server protocols, or any combinations thereof.

20. A communications terminal for rendering location dependent information, said terminal comprising:
   a GPS for retrieving a position of said communications terminal;
   a processor configured to:
   retrieve a predetermined set of categories comprising objects with location dependent information,
   determine criteria for said objects to be retrieved,
   retrieve said objects and location dependent information associated with these objects; and
   a user interface configured to
   present a spatial orientation metaphor and one or more objects in said spatial metaphor, wherein details of an object are presented in the spatial orientation metaphor when the processor determines that a distance between said position and said object is within a predetermined value range, wherein said details include descriptive and contact information,
   overlay indicators on the spatial orientation metaphor where each indicator originates from and surrounds the position, where the indicators are distinct from the predetermined value range and are arranged to provide distance information at predetermined spaced apart intervals radiating from the position, where the predetermined intervals are configured to provide an estimation of a distance between the position and the objects, and
   refine a number of retrieved objects where the refining includes entering at least a string of alphanumeric characters through the user interface and only presenting objects corresponding to the entered string of alphanumeric characters, where a refined list of objects corresponding to the entered string of alphanumeric characters changes as additional characters are added to the string of alphanumeric characters.

21. The communications terminal according to claim 20, wherein said communication terminal comprises a mobile phone, a cellular phone, a smart terminal, a personal digital assistant (PDA) or any combination thereof.

22. A computer program product, comprising a computer-readable storage medium having computer-executable components, for rendering location dependent information, said computer program product being configured to:
retrieve a position of said communications terminal;
present said position in a spatial orientation metaphor;
retrieve a predetermined set of categories comprising objects with location dependent information;
determine criteria for said objects to be retrieved;
retrieve said determined objects associated with said set of categories;
retrieve location dependent information associated with a first object of said determined objects;
present said first object in said spatial orientation metaphor;
present details of the first object in said spatial orientation metaphor when the program determines that a distance between said position and said first object is within a predetermined value range, wherein said details include descriptive and contact information;
retrieve location dependent information associated with a remainder of said objects;
present said remainder of said objects in said spatial orientation metaphor;
refine a number of presented objects where the refining includes entering at least a string of alphanumeric characters and only presenting objects corresponding to the entered string of alphanumeric characters, where a refined list of objects corresponding to the entered string of alphanumeric characters changes as additional characters are added to the string of alphanumeric characters; and
overlay indicators on the spatial orientation metaphor where each indicator originates from and surrounds the position, where the indicators are distinct from the predetermined value range and are arranged to provide distance information at predetermined spaced apart intervals radiating from the position, where the predetermined intervals are configured to provide an estimation of a distance between the position and the determined objects.

23. The computer program product according to claim 22, wherein said refining of the number of said presented objects further involves:
determining one or more preferred objects from said objects by browsing the presented objects;
exchanging information related to said one or more preferred objects with one or more external sources of information; or
setting parameters for said spatial orientation metaphor.

24. A system comprising a server, a communication network, and a communications terminal, wherein said server and said communications terminal are communicating via said communications network, and wherein said server is configured to:
provide said communications terminal with a predetermined set of categories comprising objects with location dependent information;
determining criteria for said objects to be retrieved;
retrieving said determined objects associated with said set of categories; and
retrieving location dependent information associated with a first object of said determined objects;
retrieving location dependent information associated with a remainder of said objects;
presenting said remainder of said objects in said spatial orientation metaphor;
refining the number of the presented objects where the refining includes entering at least a string of alphanumeric characters and only presenting objects corresponding to the entered string of alphanumeric characters, where a refined list of objects corresponding to the entered string of alphanumeric characters changes as additional characters are added to the string of alphanumeric characters; and
wherein details of an object are presented in a spatial orientation metaphor when the terminal determines that a distance between a position of the terminal and said object is within a predetermined value range, wherein said details include descriptive and contact information, and indicators are overlaid on the spatial orientation metaphor, where each indicator originates from and surrounds the position of the terminal, where the indicators are distinct from the predetermined value range and arranged to provide distance information at predetermined spaced apart intervals radiating from the position o the terminal, where the predetermined intervals are configured to provide an estimation of a distance between the position of the terminal and the determined objects.

25. The system according to claim 24, wherein an application for rendering location dependent information is provided by said server and executed on said communications terminal.

26. The system according to claim 25, wherein said application is browser based.

* * * * *

UNITED STATES PATENT AND TRADEMARK OFFICE
CERTIFICATE OF CORRECTION

| | |
|---|---|
| PATENT NO. | : 8,060,499 B2 |
| APPLICATION NO. | : 11/534842 |
| DATED | : November 15, 2011 |
| INVENTOR(S) | : Mansikkaniemi |

It is certified that error appears in the above-identified patent and that said Letters Patent is hereby corrected as shown below:

Column 8, line 60, in Claim 3, delete "according" and insert -- according to -- therefor.

Column 12, line 43, in Claim 24, delete "o" and insert -- of -- therefor.

Signed and Sealed this
Fourteenth Day of February, 2012

David J. Kappos
*Director of the United States Patent and Trademark Office*